C. T. WILLIAMS.

SAFETY CRANK FOR EXPLOSIVE ENGINES.

APPLICATION FILED OCT. 20, 1914.

Reissued Jan. 5, 1915.

13,862.

Witnesses:
C. Prosperi
J. F. Lloyd

Inventor
Charles T. Williams
By his Attorneys
Prindle & Wright.

UNITED STATES PATENT OFFICE.

CURLES T. WILLIAMS, OF TRENTON, NEW JERSEY.

SAFETY-CRANK FOR EXPLOSIVE-ENGINES.

13,862. Specification of Reissued Letters Patent. Reissued Jan. 5, 1915.

Original No. 1,042,303, dated October 22, 1912, Serial No. 635,671. Application for reissue filed October 20, 1914. Serial No. 867,669.

*To all whom it may concern:*

Be it known that I, CURLES T. WILLIAMS, of Trenton, in the county of Mercer, and in the State of New Jersey, have invented a certain new and useful Improvement in Safety-Cranks for Explosive-Engines, and do hereby declare that the following is a full, clear, and exact description thereof.

The object of my invention has been to provide an automobile crank which will be released in case the engine "kicks back," so that a person "cranking" the engine will not be injured, and to such ends my invention consists in the safety automobile crank hereinafter specified.

Figure 1:
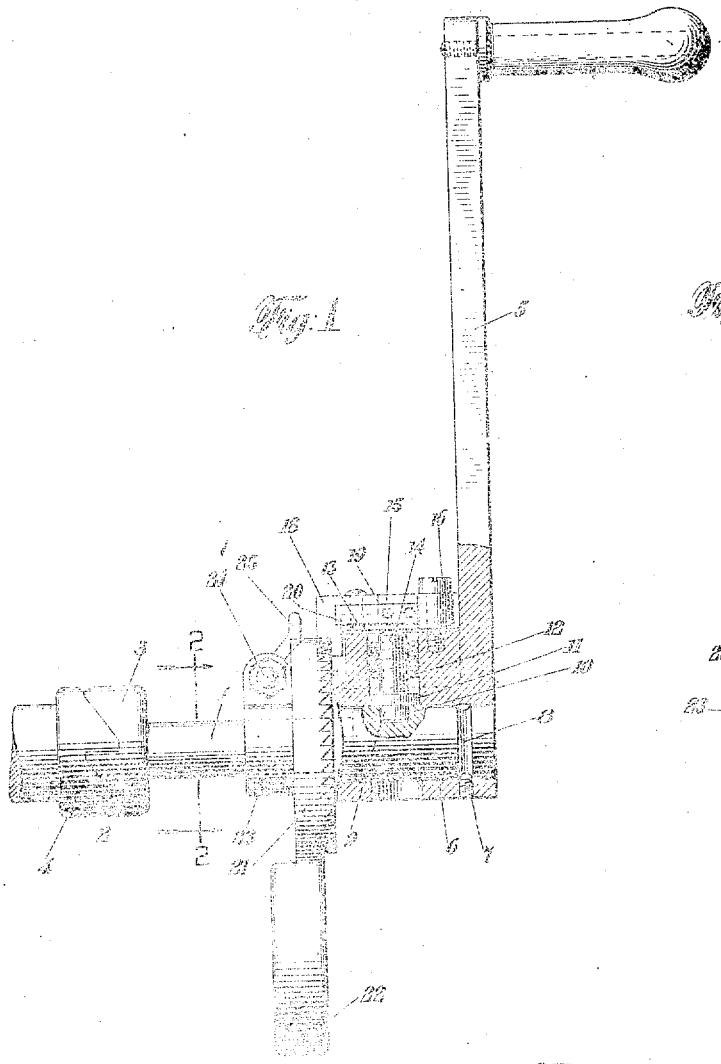
Figure 2:
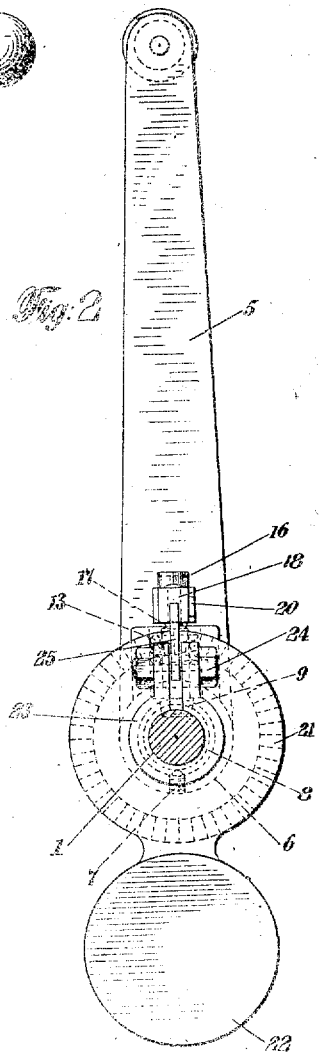
Figure 3:
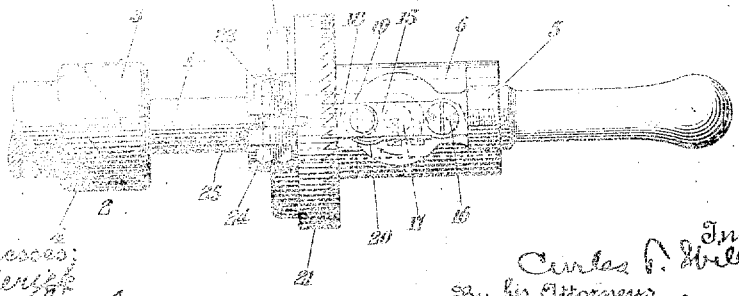

In the accompanying drawings—Figure 1 is a side elevation, partly in section, of one embodiment of my invention; Fig. 2 is a section on the line 2—2 of Fig. 1; Fig. 3 is a top view of Fig. 1.

In the cranking of an automobile engine it frequently happens that a premature explosion occurs which causes the engine to rotate the crank shaft backward, a motion for which the operator is not prepared, and which accordingly wrenches the crank away from him and frequently causes it to strike his arm, occasionally breaking the arm.

It is the object of my invention to overcome this difficulty and to avoid injury in case the engine should kick back as stated.

In the accompanying drawings I have illustrated the best embodiment of my invention known to me, but such embodiment is to be regarded as typical only of many possible embodiments.

In the illustrated embodiment, the crank shaft 1, or shaft to which the hand crank is applied, is engaged with the engine shaft 2 by a clutch composed of members 3 and 4 which are automatically disengaged as soon as the engine begins to rotate of its own power. The hand crank 5 is mounted on the crank shaft by means of a hub 6 which is preferably integral with the hand crank, the hub being rotatably mounted on the crank shaft and being prevented from longitudinal movement by the engagement of a screw 7 in the hub with the neck or groove 8 formed in the shaft. The hub is normally locked to the shaft by a plug 9 which is reciprocally mounted in the hub and which has a preferably tapered end which engages the tapered recess 10 in the shaft. The plug is preferably provided with a collar or other enlargement 11, which, by engagement with a shoulder 12 in the hub, limits the outward movement of the plug. The plug is normally forced outward by a spring 13 surrounding the plug and resting on the shoulder 12, said spring engaging a cross pin 14 in the plug. The plug is held in inner or locked position by a lever 15, which is secured by a pivot, such as the screw 16, to the hub. The said lever preferably has a depression 17 formed on its under side so as to yieldingly engage the rounded end of the plug and thus to require some little force to swing the lever from over the plug. A pawl 18 is pivoted to the outer end of the said lever, the pawl and lever having shoulders at 19 which limit the movement of the pawl in the direction of the arrow shown in Fig. 3, while movement in the opposite direction is permitted, but yieldingly resisted by a spring 20. A ratchet disk 21 is loosely mounted on the hub and is provided with a weight 22 or other means for normally maintaining it in a fixed position. A split bushing 23 is mounted on the hub, or a sleeve extension thereof, and provided with a draw bolt 24 by which it may be made to clamp the said hub or sleeve. A latch 25 is pivoted on the draw bolt and can either be moved to the right, in Fig. 1, to engage a notch in the ratchet disk, or can be moved out of engagement with such notch to leave the ratchet disk free.

In the operation of my crank shaft the latch being disengaged from the weighted ratchet disk, and the plug being forced into the recess 10 and held therein by the lever 15, the operator engages the clutch members 3 and 4 and starts to crank the engine. During this motion the pawl 18 rides idly over the teeth of the ratchet disk. If the engine should explode prematurely or "back fire," and jerk the crank in the reverse direction from that indicated by the arrow in Fig. 3, the ratchet disk, being held from rotation by the weight, would engage the pawl and prevent its rotation with the crank shaft, thus causing the pawl, by engagement of the shoulders at 19, to swing the lever 15 from over the rounded end of the plug, and permitting the spring 13 to withdraw the plug, releasing the hand crank from the crank shaft. The operator will thus be saved from injury by the back fire.

In order to hold the crank in a vertical position, as is desirable when the engine is running, the latch 25 may be engaged in the notch in the ratchet disk, and as the split bushing is clamped to the shaft, this will lock the shaft to the weighted ratchet disk and prevent the shaft and hand crank from rotating.

I claim—

1. In a safety crank for explosive engines, the combination of a shaft adapted to be connected to an engine, a hand crank for rotating the same, having a hub journaled on said shaft, a plug mounted in said hub, and adapted to engage a shoulder on said shaft, a lever adapted to be swung over said plug and to hold the latter in locked position, a finger yieldingly mounted on said lever, and a relatively stationary shoulder adapted to hold said finger and to swing said lever from over said plug.

2. In a safety crank for explosive engines, the combination of a shaft adapted to be connected to an engine, a hand crank having a hub journaled on said shaft, a plug mounted in said hub adapted to engage a shoulder on said shaft, a spring tending to retract said plug, a lever adapted in one position to stand over said plug and hold the latter in locked position, a finger pivoted to said lever and yieldable when said crank is moved in normal cranking direction, and a relatively stationary shoulder against which said finger is adapted to catch during backward movement of said crank.

3. In a safety crank for explosive engines, the combination of a shaft adapted to be connected to an engine, a hand crank having a hub journaled on said shaft, a plug mounted on said hub and adapted to engage a shoulder on said shaft, a spring for retracting said plug, a lever adapted to swing over said plug and hold it in locked position, a finger pivoted to said lever and yieldable in a direction away from normal cranking movement, and a ratchet disk having teeth adapted to engage said finger and beveled in normal cranking direction.

4. In a safety crank for explosive engines, the combination of a shaft adapted to be connected to an engine, a hand crank having a hub journaled on said shaft, a plug mounted on said hub and adapted to engage a shoulder on said shaft, a spring for retracting said plug, a lever adapted to swing over said plug and hold it in locked position, the end of said plug being rounded and a depression being formed in said lever to fit said rounded end, a finger pivoted to said lever and yieldable in a direction away from normal cranking movement, and a ratchet disk having teeth adapted to engage said finger, and beveled in normal cranking direction.

5. In a safety crank for explosive engines, the combination of a shaft adapted to be connected to an engine, a hand crank having a hub journaled on said shaft, a plug mounted on said hub and adapted to engage a shoulder on said shaft, a spring for retracting said plug, a lever adapted to swing over said plug and hold it in locked position, a finger pivoted to said lever and yieldable in a direction away from normal cranking movement, a ratchet disk having teeth adapted to engage said finger and beveled in normal cranking direction, and means for preventing the rotation of said ratchet disk.

6. In a safety crank for explosive engines, the combination of a shaft adapted to be connected to an engine, a hand crank having a hub journaled on said shaft, a plug mounted on said hub and adapted to engage a shoulder on said shaft, a spring for retracting said plug, a lever adapted to swing over said plug and hold it in locked position, a finger pivoted to said lever and yieldable in a direction away from normal cranking movement, a ratchet disk having teeth adapted to engage said finger and beveled in normal cranking direction, and means for preventing the rotation of said ratchet disk, said means comprising a weight attached thereto.

7. In a safety crank for explosive engines, the combination of a shaft adapted to be connected to an engine, a hand crank having a hub journaled on said shaft, a plug mounted on said hub and adapted to engage a shoulder on said shaft, a spring for retracting said plug, a lever adapted to swing over said plug and hold it in locked position, a finger pivoted to said lever and yieldable in a direction away from normal cranking movement, a ratchet disk having teeth adapted to engage said finger and beveled in normal cranking direction, means for preventing the rotation of said ratchet disk, and means for fastening said crank to said ratchet disk.

8. In a safety crank for explosive engines, a combination of a shaft adapted to be connected to an engine, a hand crank having a hub journaled on said shaft, a plug mounted on said hub and adapted to engage a shoulder on said shaft, a spring for retracting said plug, a lever adapted to swing over said plug and hold it in locked position, a finger pivoted to said lever and yieldable in a direction away from normal cranking movement, a ratchet disk having teeth adapted to engage said finger and beveled in normal cranking direction, means for preventing the rotation of said ratchet disk, and means for fastening said crank to said ratchet disk, said means comprising a latch carried by said hub and a notch on said ratchet disk that would be engaged by said latch.

CURLES T. WILLIAMS.

Witnesses:
EARL KELTY,
HOWARD HEATH.